(12) United States Patent
Jäger et al.

(10) Patent No.: US 6,345,812 B1
(45) Date of Patent: Feb. 12, 2002

(54) PLATE-LIKE WATER AERATOR

(76) Inventors: Andreas Jäger, Aussiger Wende 11, D-30559 Hannover; Christian Jäger, Auf der Körnerwiese 9, D-60322 Frankfurt/M; Sebastian Jäger, Am Rotdorn 15, D-30657 Hannover, all of (DE); Claudius Jäger, 1253 N. Cedarbrook Rd., Boulder, CO (US) 80304

( * ) Notice: Subject to any disclaimer, the term of this patent is extended or adjusted under 35 U.S.C. 154(b) by 0 days.

(21) Appl. No.: 09/535,480

(22) Filed: Mar. 24, 2000

(30) Foreign Application Priority Data

Mar. 25, 1999 (DE) .......................................... 199 13 682

(51) Int. Cl.$^7$ ................................................. B01F 3/04
(52) U.S. Cl. ................................. 261/122.1; 261/122.2
(58) Field of Search ........................... 261/122.1, 122.2, 261/DIG. 70; 210/220

(56) References Cited

U.S. PATENT DOCUMENTS

| | | | | |
|---|---|---|---|---|
| 3,997,634 A | * | 12/1976 | Downs | 261/122.2 |
| 5,098,581 A | * | 3/1992 | Roediger | 261/122.1 |
| 5,693,265 A | * | 12/1997 | Jager et al. | 261/122.2 |
| 5,762,835 A | * | 6/1998 | Bassfeld | 261/122.2 |
| 6,145,817 A | * | 11/2000 | Jager et al. | 261/122.2 |

* cited by examiner

Primary Examiner—C. Scott Bushey
(74) Attorney, Agent, or Firm—R. W. Becker & Associates; R. W. Becker

(57) ABSTRACT

A plate-like water aerator is provided. A plate, made of elastomeric material, is disposed on a rigid, essentially planar mounting support and covers the one or more air supply connections thereof. The plate is provided with fine slits for the discharge of air. The mounting support has a circumferential rim that is angled-off at substantially right angles. The mounting support also has a circumferential rib that extends parallel to the rim in such a way as to form a circumferential groove between the rib and the rim. The plate has an essentially u-shaped rim portion, a radially inwardly disposed leg of which surrounds the rim of the mounting support and engages in the circumferential groove in a manner free of play.

3 Claims, 1 Drawing Sheet

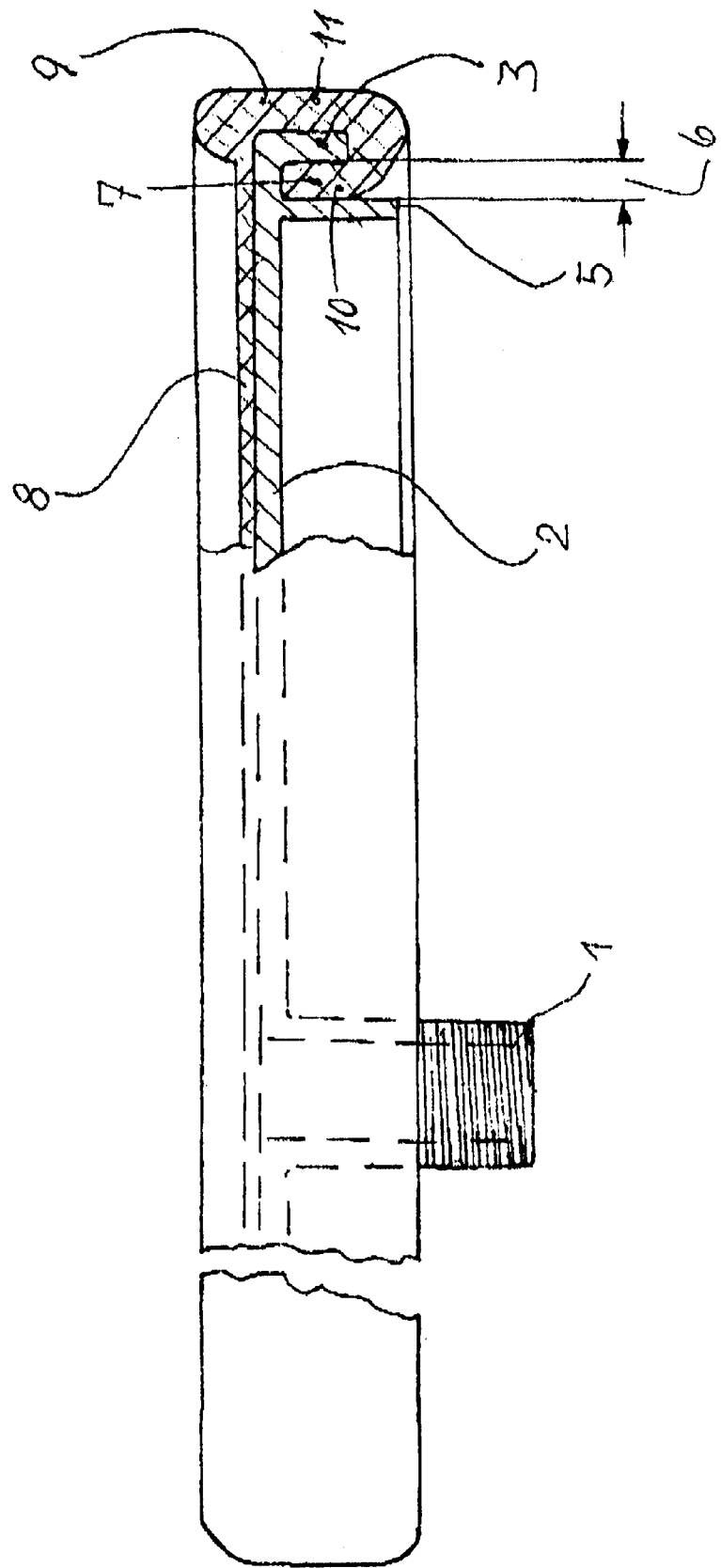

PLATE-LIKE WATER AERATOR

BACKGROUND OF THE INVENTION

The present invention relates to a plate-like water aerator, especially for water treatment or in connection with waste water. The aerator has a rigid, essentially planar mounting support upon which is disposed a plate that is made of elastomeric material and is provided with fine slits for the discharge of air. The mounting support has one or more connections that are embodied for the supply of air and are covered by the plate. In addition, the mounting support has a circumferential, angled-off rim that extends perpendicularly downwardly and that is surrounded by an essentially unshaped rim portion of the plate.

With known water aerators of this type, a positive connection is achieved by the u-shaped rim portion and the downwardly angled-off rim of the mounting support. This is intended to ensure securement of the plate without additional securing means, in order in this way, for example, to be able to eliminate pressure rims that are screwed on. Unfortunately, this heretofore known, simplified securement of the rim of the plate has the drawback that especially after longer periods of operation they become unreliable and hence unusable due to aging.

It is therefore an object of the present invention to provide a rim securement having an increased reliability and service life.

BRIEF DESCRIPTION OF THE DRAWING

This object, and other objects and advantages of the present invention will appear more clearly from the following specification in conjunction with the accompanying drawing, which is a partially cross-sectioned side view of one exemplary embodiment of the inventive plate aerator.

SUMMARY OF THE INVENTION

The plate-like water aerator of the present invention is characterized primarily in that the mounting support has a rib that extends parallel to the circumferential rim thereof in such a way that a circumferential groove is formed between the rib and the rim, wherein the radially inwardly disposed leg of the u-shaped rim portion of the plate engages in the circumferential groove in a manner free of play.

The engagement of the radially inner leg in the circumferential groove leads to an increased retaining force because now it is possible to pull the leg out of its groove only after overcoming vacuum forces. Thus, it is generally only possible to achieve separation by utilizing dismantling tools, whereas during normal operation dislodgment of the rim of the plate is not possible, even after a longer period of operation.

Further specific features of the present invention will be described in detail subsequently.

DESCRIPTION OF PREFERRED EMBODIMENTS

Referring now to the drawing in detail, the aerator, which preferably has a circular contour, is supplied from below by means of a connector 1, which is a fixed component of a rigid mounting support that includes a main body 2, which has a circumferential rim 3 that is angled-off downwardly at essentially right angles to the main body. Also directed at right angles downwardly is a circumferential rib 5 that extends parallel to the rim 3; the rib 5 is, however, longer than the rim 3, as measured from the main body 2. The thicknesses of the rib 5 and of the rim 3 are essentially the same, and their spacing 6 from one another corresponds approximately to the thickness of the rim 3. There thus results a circumferential groove 7 between the rim 3 and the rib 5.

Disposed loosely upon the main body 2 is a plate 8 that is made of rubber or other elastomeric material and that is provided with fine slits. The plate 8 is suitable for issuing fine air bubbles when compressed air is conducted into the connector 1 and hence between the plate 8 and the main body 2.

To secure the plate 8 upon the mounting support, the plate 8 is provided with a circumferential rim 9 that has an essentially u-shaped configuration; the legs 10 and 11 of the rim 9 enclose the rim 3 between them. Furthermore, the upwardly directed, free leg 10 fills the circumferential groove 7 in a manner free of play.

To mount the plate 8, the leg 10 must to a certain extent be rolled into the circumferential groove 7. If the assembly is to be taken apart, it is necessary to utilize sharp tools in order to be able to remove the leg 10 from the circumferential groove 7, which is possible only by overcoming vacuum forces. For this reason, during operation a permanent, fixed anchoring of the rims of the plate 8 results.

The specification incorporates by reference the disclosure of priority document DE 199 13 682.3 of Mar. 25, 1999.

The present invention is, of course, in no way restricted to the specific disclosure of the specification and drawings, but also encompasses any modifications within the scope of the appended claims.

What we claim is:

1. A plate-shaped water aerator, comprising:
   a rigid, essentially planar mounting support having at least one air supply connection; and
   a plate, made of elastomeric material, disposed on the mounting support and covering said at least one air supply connection thereof, wherein said plate is provided with fine slits for the discharge of air, wherein said mounting support has a circumferential rim that is angled-off at substantially right angles in a direction away from said plate, wherein said mounting support also has a circumferential rib that extends parallel to said circumferential rim in such a way as to form a circumferential groove between said rim and said rib, said circumferential groove having a depth that is significantly greater than a width thereof, and wherein said plate has an essentially u-shaped rim portion, a radially inwardly disposed leg of which surrounds said circumferential rim of said mounting support and engages in said circumferential groove in a manner free of play.

2. A water aerator according to claim 1, wherein said circumferential groove has a width that corresponds at least essentially to a thickness of said circumferential rim of said mounting support.

3. A water aerator according to claim 1, wherein said circumferential rib of said mounting support projects beyond said circumferential rim thereof.

* * * * *